H. W. BROWN.

Cotton Gin.

No. 1,422. Reissued Feb. 24, 1863.

N. PETERS, Photo-Lithographer, Washington, D. C.

UNITED STATES PATENT OFFICE.

MARY JANE BROWN, OF BROOKLYN, NEW YORK, ADMINISTRATRIX OF HIRAM W. BROWN, DECEASED, AND ASSIGNOR TO HERSELF, JEREMIAH JOHNSON, JR., AND FRANKLIN H. LUMMUS, OF BROOKLYN, AND THEODORE BOURNE, OF NEW YORK, N. Y., ASSIGNEES OF SAID BROWN, DECEASED.

IMPROVEMENT IN COTTON-GINS.

Specification forming part of Letters Patent No. 19,679, dated March 23, 1858; Reissue No. 1,422, dated February 24, 1863.

*To all whom it may concern:*

Be it known that HIRAM W. BROWN, late of Millville, New Jersey, did invent certain new and useful Improvements in Cotton-Gins; and we, MARY JANE BROWN, administratrix of the goods and estate of the said HIRAM W. BROWN, deceased, JEREMIAH JOHNSON, Jr., and FRANKLIN H. LUMMUS, all of Brooklyn, Kings county, New York, and THEODORE BOURNE, of the city and State of New York, (being now the sole owners of said invention,) do hereby declare that the following is a full, clear, and exact description of the same, reference being made to the annexed drawings, making a part of this specification, in which—

Figure 1:
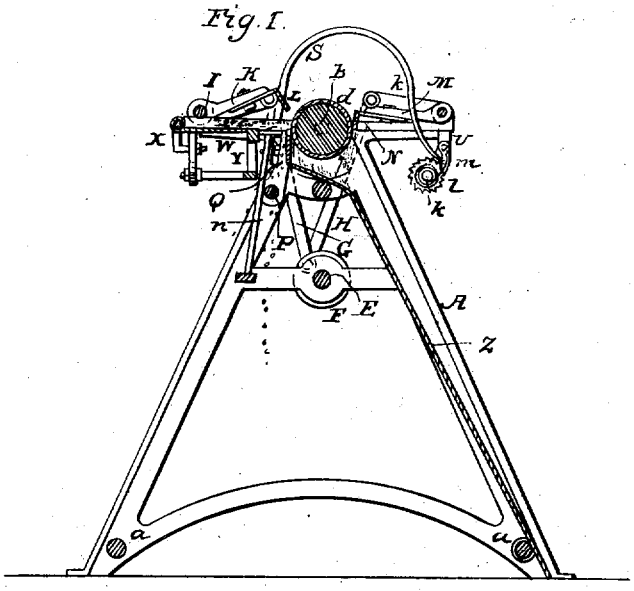
Figure 2:
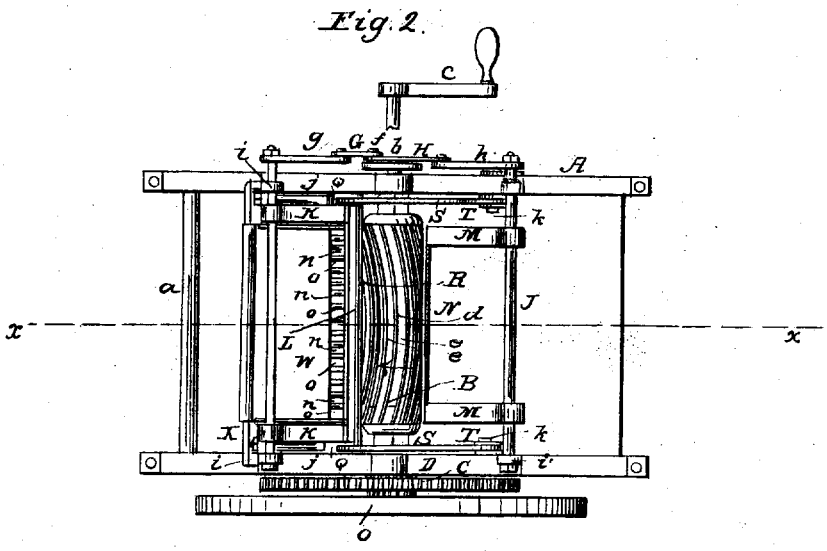

Figure 1 is a transverse vertical section on the line *x x* of Fig. 2. Fig. 2 is a top or plan view.

Similar letters indicate similar parts in both the figures.

This invention is an improvement upon what is commonly known as the "roller-gin," which is a combination of a leather-covered roller, acting to draw the staple between said roller and a fixed breast or pressure plate, while a vibrating stripping-plate operates to draw off the seeds from the face of the roller, which seeds then fall by gravity through the bars of the feed-board, the cleaned cotton being taken off from the roller, by a doffer or other suitable device, and delivered separate from the seeds.

Previous to the date of the invention of the said BROWN the operation of this class of gins had been always imperfect, arising from the arrangement by which the stripping-plate was operated in its connection with the bars or grating of the feed-board. This was to make the stripping-plate work between the ends of the bars and the breastplate, its upper edge acting to strip the seeds, which then fell through the grating; but as the stripping-plate retired for a new upward motion it would often carry down with it past the bars small tufts of the cotton which was being fed up, thus not merely wasting the staple, but impairing the value of the seed for some uses. This defect is by the present invention wholly obviated; and it consists, first, in an improved arrangement of the pressure or breast plate and of the stripping-plate in their relation to the grating of the feed-board, whereby the bars thereof can be extended quite up to the breastplate, which has no motion, while the movable stripping-plate is operated from above down toward the said bars, not necessarily coming into contact with them, but facilitating thus the falling of the seeds by gravity between the bars; secondly, in the employment, in connection with the roller, stripper, and pressure-plate, of a yielding feed-board and screen or grating, whereby the process is considerably expedited.

The manner in which we prefer to carry the said invention into effect is shown in the following description.

At A is represented a frame supporting the working parts of the machine. This frame may be of cast metal and formed of two triangular-shaped skeleton sides, connected by cross-ties *a*. On the upper part of the frame is placed a roller, B, the shaft *b* of which projects beyond one side of the frame and is provided with a crank, *c*. This roller may be of metal, but its periphery is covered with leather, *d*, as usual, and the leather is creased in curved form, as shown at *e*, Fig. 2, the concave sides of the creases facing the direction in which the roller rotates, as shown by the arrow on Fig. 2. The end of the roller-shaft *b* opposite that to which the crank is attached has a spur-wheel, C, upon it, gearing into a pinion, D, fitted on one end of a shaft, E, placed in the frame A below the roller B, and in the same plane. On the end of the shaft E opposite to that to which the pinion is attached there is a crank, F, and the lower ends of two connecting-rods, G H, are placed on the same pin, *f*, of this crank. The upper ends of the rods G H are attached, respectively, to the ends of arms *g h*, placed on the ends of shafts I J, said shafts being at opposite sides of the roller B, and at suitable distance from it, the bearings *i* of the shafts being on the ends of bars *j* on the top of the frame A. On the shaft I two arms, K K, are placed, and a plate, L, is attached to the ends of the arms, forming a stripping-plate. This plate projects downward at right angles with the arms K K, as shown clearly in Fig. 1. . On the shaft J two similar arms, M M, are placed, having a similar plate, N, attached to them to form a doffer.

At O is a fly-wheel on one end of the shaft E. The arms K and M are of such length that the plates L N are quite near the roller B; and it will be seen that when the shaft *b* is turned a vibratory motion is given both shafts I J, and the plates L N are made to work up and down near the periphery of the roller, and at opposite sides of it.

At P is a shaft attached to one side of the frame A, near the upper part, and having an arm, Q, attached to it at each end.

To the upper ends of the arms Q Q a steel plate, R, is attached, which may be made to bear against the periphery of the roller B (to form the pressure-plate) by means of springs S S, which are curved steel bars, each having one end attached to an arm Q, and the opposite end attached to barrel or coil springs T T, secured to small shafts K K in the pendants U U. The outer ends of these shafts have each a ratchet, *l*, on them, into which pawls *m*, attached to the pendants U U, take.

At V is a bar extending across the frame A, and having a series of rods, *n*, attached to it. These rods are upright, nearly vertical, and their upper ends are bent over in a horizontal position toward the plate R.

At W is the feed board or plate, the outer edge of which may be fitted loosely around or upon a shaft, X, attached to the frame. The inner end of the feed board or plate has a series of horizontal rods, *o*, attached to it, said rods lying between the upper horizontal parts of the rods *n*. The inner part of the feed board or plate rests upon a spring, Y.

In operation the cotton to be ginned is placed on the feed-board W, and motion being given to the machine the cotton will be drawn by the roller B up over the upper edge of the pressure-plate R, which should be thin along that edge, while at the same time it is subjected to the action of the stripping-plate L, which vibrates near to the plate R, and immediately over the ends of the grating, formed by the alternating rods *o*, attached to the feed-board and the horizontal part of the fixed rods *n*. These rods may extend nearly or quite up to the pressure-plate; but it will be observed that the action of the stripping-plate is wholly above those rods, and as the pressure-plate has only a slight motion to or from the roller B there is no moving part in connection with the bars of the grating which could carry down any tufts of cotton, as in the old machines. The inner edge of the feed-board W rests upon the spring Y, and therefore has a slight trembling or vibrating motion given to it by the action of the stripping-plate upon the cotton, and as each alternate rod *n* of the grating is fixed, and each other rod *o* is attached to the feed-board, the seed is more readily made to fall through. The ginned cotton passes underneath the roller, and either falls by gravity down the guide Z or is detached by the doffer N. The pressure-plate R has a slight yielding motion controlled by the springs S S, so that in case gravel or other foreign matter should pass between it and the roller B neither would be injured. The curved creases *e* on the leather covering of the roller are in such direction with reference to the direction of motion of the roller that said creases serve to prevent the cotton from spreading toward the ends of the roller.

What we claim as the invention of the said HIRAM W. BROWN is—

1. The arrangement of the pressure-plate and of the stripping-plate in their relation to the grating of the feed-board, substantially in the manner and for the purposes set forth.

2. The employment, in combination with the roller B, stripping-plate L, and pressure-plate R, of the yielding or vibrating feed-board having its grating formed of alternate sets of rods, *o* and *n*, in the manner and for the purpose substantially as described.

In witness whereof we have hereunto subscribed our names.

MARY JANE BROWN,
*Administratrix.*
JEREMIAH JOHNSON, JR.
FRANKLIN H. LUMMUS.
THEODORE BOURNE.

Witnesses:
A. H. MAYNARD,
A. F. BRITTON.